United States Patent
Tiwari et al.

(10) Patent No.: US 9,964,002 B2
(45) Date of Patent: *May 8, 2018

(54) COMBINED CYCLE POWER PLANT SYSTEM AND RELATED CONTROL SYSTEMS AND PROGRAM PRODUCTS

(71) Applicant: General Electric Company, Schenectady, NY (US)

(72) Inventors: Awadesh Kumar Tiwari, Bangalore (IN); William Forrester Seely, Taylors, SC (US)

(73) Assignee: General Electric Company, Schenectady, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/678,755

(22) Filed: Aug. 16, 2017

(65) Prior Publication Data

US 2017/0342865 A1 Nov. 30, 2017

Related U.S. Application Data

(63) Continuation of application No. 14/281,335, filed on May 19, 2014.

(51) Int. Cl.
| | |
|---|---|
| *F01K 23/10* | (2006.01) |
| *G05B 23/02* | (2006.01) |
| *F01K 7/16* | (2006.01) |
| *F01K 23/18* | (2006.01) |
| *G05B 15/02* | (2006.01) |

(52) U.S. Cl.
CPC ............ *F01K 23/101* (2013.01); *F01K 7/165* (2013.01); *F01K 23/18* (2013.01); *G05B 15/02* (2013.01); *G05B 23/0224* (2013.01); *Y02E 20/16* (2013.01)

(58) Field of Classification Search
CPC ....... Y02E 20/16; F01K 13/02; F01K 23/101; F01K 23/10; F02C 6/18; F02C 9/28
See application file for complete search history.

(56) References Cited

U.S. PATENT DOCUMENTS

| | | | | |
|---|---|---|---|---|
| 3,756,023 A | * | 9/1973 | Berman | F01K 23/108 122/406.1 |
| 3,879,616 A | * | 4/1975 | Baker | F01K 13/02 290/2 |
| 8,839,664 B2 | * | 9/2014 | Bassily | G01M 15/14 73/112.01 |

* cited by examiner

*Primary Examiner* — Pascal M Bui Pho
*Assistant Examiner* — Stefan Ibroni
(74) *Attorney, Agent, or Firm* — Ernest G. Cusick; Hoffman Warnick LLC

(57) ABSTRACT

Various embodiments include a system having: at least one computing device configured to monitor a combined-cycle (CC) power plant during a transient event by performing actions including: determining whether a change in an operating condition of a component of the CC power plant is unintentional, the determining including comparing control system instructions for the component of the CC power plant with a reference look-up table, the reference look-up table including correlation data for the control system instructions for the component and historical data about the operating condition of the component; and providing instructions to a control system of the CC power plant to modify the operating condition in the CC power plant in response to determining that the change in operating condition of the component is unintentional.

12 Claims, 2 Drawing Sheets

US 9,964,002 B2

COMBINED CYCLE POWER PLANT SYSTEM AND RELATED CONTROL SYSTEMS AND PROGRAM PRODUCTS

CROSS-REFERENCE TO RELATED APPLICATION

This application is a continuation application of co-pending U.S. patent application Ser. No. 14/281,335, filed May 19, 2014, which is hereby incorporated by reference in its entirety.

FIELD OF THE INVENTION

The subject matter disclosed herein relates to control systems. More particularly, the subject matter disclosed herein relates to control systems for power plants.

BACKGROUND OF THE INVENTION

Combined-cycle power plants are those that operate both gas and steam turbomachines (e.g., gas and steam turbines) in a system to efficiently utilize exhaust gas to transfer heat to the steam system. Combined-cycle power plants often utilize different configurations of gas and/or steam turbomachines to produce a desired output to meet demand at different times. This requires a controlled transition from one configuration to the next. In many cases, however, transition from one configuration to another creates losses of power, as well as unstable bypass operation conditions, causing, for example, steam leakage and performance decreases.

BRIEF DESCRIPTION OF THE INVENTION

Various disclosed embodiments include a system having: at least one computing device configured to monitor a combined-cycle (CC) power plant during a transient event by performing actions including: determining whether a change in an operating condition of a component of the CC power plant is unintentional, the determining including comparing control system instructions for the component of the CC power plant with a reference look-up table, the reference look-up table including correlation data for the control system instructions for the component and historical data about the operating condition of the component; and providing instructions to a control system of the CC power plant to modify the operating condition in the CC power plant in response to determining that the change in operating condition of the component is unintentional.

A first aspect of the invention includes a system having: at least one computing device configured to monitor a combined-cycle (CC) power plant during a transient event by performing actions including: determining whether a change in an operating condition of a component of the CC power plant is unintentional, the determining including comparing control system instructions for the component of the CC power plant with a reference look-up table, the reference look-up table including correlation data for the control system instructions for the component and historical data about the operating condition of the component; and providing instructions to a control system of the CC power plant to modify the operating condition in the CC power plant in response to determining that the change in operating condition of the component is unintentional.

A second aspect of the invention includes: a computer program product having program code, which when executed by at least one computing device, causes the at least one computing device to monitor a combined-cycle (CC) power plant during a transient event by performing actions including: determining whether a change in an operating condition of a component of the CC power plant is unintentional, the determining including comparing control system instructions for the component of the CC power plant with a reference look-up table, the reference look-up table including correlation data for the control system instructions for the component and historical data about the operating condition of the component; and providing instructions to a control system of the CC power plant to modify the operating condition in the CC power plant in response to determining that the change in operating condition of the component is unintentional.

A third aspect of the invention includes a system having: a combined-cycle (CC) power plant having: at least one steam turbine (ST); at least one gas turbine (GT); and at least one bypass conduit bypassing one of the at least one ST or the at least one GT; and at least one computing device configured to monitor the CC power plant during a transient event by performing actions including: determining whether a change in an operating condition of a component of the CC power plant is unintentional, the determining including comparing control system instructions for the component of the CC power plant with a reference look-up table, the reference look-up table including correlation data for the control system instructions for the component and historical data about the operating condition of the component; and providing instructions to a control system of the CC power plant to modify the operating condition in the CC power plant in response to determining that the change in operating condition of the component is unintentional.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
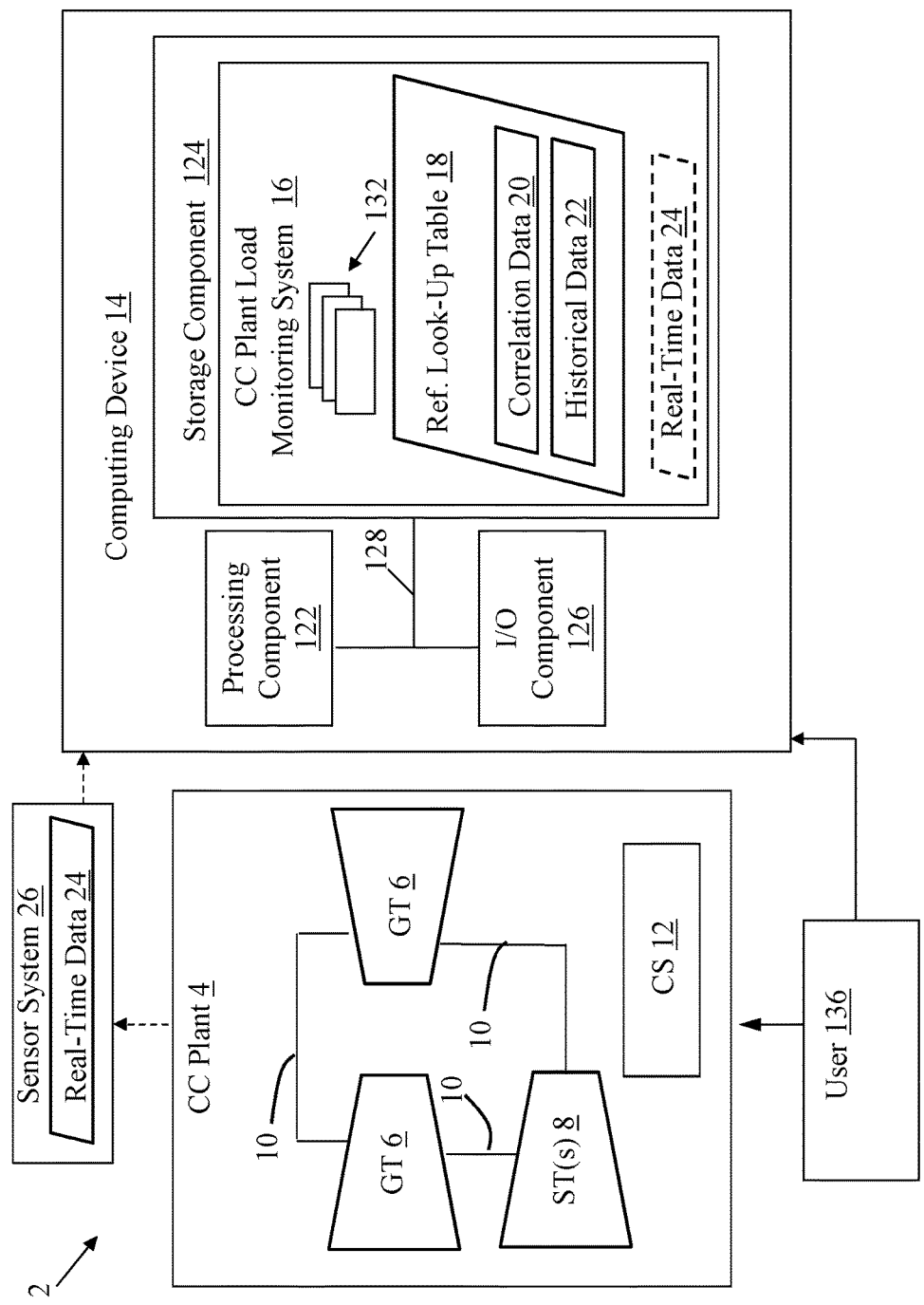
FIG. 1 shows an illustrative environment including a compressor and a blade monitoring system according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the subject matter disclosed herein relates to control systems. More particularly, the subject matter disclosed herein relates to control systems for combined-cycle (CC) power plants.

As noted herein, in many cases, transition from one configuration of a CC power plant to another creates losses of power, as well as unstable bypass operation conditions, causing, for example, steam leakage and performance decreases. In particular, when transitioning from a multiple gas turbine (GT), single steam turbine (ST) configuration to a single GT, single ST configuration, flow patterns, output requirements, etc. will change, requiring the power plant to respond in an efficient way to this transition.

Various embodiments include systems, computer program products and computer-implemented methods for controlling load in a combined-cycle power plant, e.g., in relation to a transitional event such as a configuration change. In contrast to the conventional approaches, various embodiments perform a systems approach to generate and calibrate control projections (curves) for various transient scenarios, using an empirical framework along with physics-based models of the power plant. That is, using self-learned models based upon historical power plant data, the approaches according to various embodiments coordinate gas turbine (GT), steam turbine (ST) and bypass operations to efficiently transition between power plant configurations. In particular, approaches according to various embodiments provide operating instructions to actuate one or more control valves in a CC power plant in response to a transient event in order enhance the efficiency of that power plant during (and in some cases, following) the transient event.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

FIG. 1 shows a schematic diagram illustrating a system 2, including a combined-cycle (CC) power plant (or, CC plant) 4, having at least one gas turbine (GT) 6 (two shown), at least one steam turbine (ST) 8, and at least one bypass conduit 10. The GT(s) 6, ST 8 and bypass conduits 10 can include conventional components known in the art. Also shown, the CC plant 4 can include a control system 12 for controlling operation of one or more components (e.g., GT(s) 6, ST 8, bypass conduits 10, etc.) in the CC plant 4.

The control system (CS) 12 can include any conventional control system components used in controlling a combined cycle power plant system. For example, the control system 12 can include electrical and/or electro-mechanical components for actuating one or more components in the CC plant 4. The control system 12 can include conventional computerized sub-components such as a processor, memory, input/output, bus, etc. The control system 12 can be configured (e.g., programmed) to perform functions based upon operating conditions from an external source (e.g., at least one computing device 14), and/or may include pre-programmed (encoded) instructions based upon parameters of the CC plant 4.

The system 2 can also include at least one computing device 14 connected (e.g., hard-wired and/or wirelessly) with the control system 12 and the CC plant 4. In various embodiments, the computing device 14 is operably connected with the CC power plant 4, e.g., via a plurality of conventional sensors such as flow meters, temperature sensors, etc. The computing device 14 can be communicatively connected with the control system 12, e.g., via conventional hard-wired and/or wireless means. The at least one computing device 14 can include a CC plant load monitoring system 16, which is configured to monitor the CC power plant 4 during a transient event. As used herein, a transient event is defined as the time surrounding (e.g., by 1-2 hours) a transition from one GT-ST configuration to another GT-ST configuration. One example includes a transition from a 2-GT, 1-ST configuration to a 1-GT, 1-ST configuration, and vice-versa. Other multi-ST and/or multi-GT to single-ST and/or single-GT configurations, and vice versa, are included within the definition of a transient event.

The computing device 14 is shown in communication with sensor system 26, which may store real-time data 24 and/or transmit real-time data 24 about one or more components in the CC plant 4 to computing device 14. Further, computing device 14 is shown in communication with a user 136. A user 136 may be, for example, a programmer or operator. Interactions between these components and computing device 14 are discussed elsewhere in this application.

As described herein, the computing device 14 is configured to determine whether a change in an operating condition of a component in the CC power plant 4 is unintentional. The component in the CC power plant 4 can include the at least one GT 6, the at least one ST 8 and/or the at least one bypass conduit 10. The computing device 14 can determine whether the change in the operating condition is unintentional by comparing control system instructions (sent from control system 12 to CC power plant 4) for the component of the CC power plant 4, with a reference look-up table 18 (e.g., stored in the control system 12 computing device 14 and/or external store).

In some embodiments, the operating condition includes a power sharing proportion between the at least one ST 8 and the at least one GT 6 a load rejection by the at least one ST 8 or the at least one GT 6 a bypass flow rate through the at least one bypass conduit 10, or a power drop by the at least one ST 8 or the at least one GT 6 In some cases, the operating condition is measured by at least one of ST megawatt output (output of the ST 8), GT megawatt output (output of the GT 6) or fluid pressure in the bypass conduit 10.

The reference look-up table 18 can include correlation data 20 for the control system instructions for the component (e.g., GT 6, ST 8 and/or bypass conduit 10) and historical data 22 about the operating condition of the component (e.g., the GT 6, ST 8 and/or bypass conduit 10). For example, the reference look-up table 18 can include correlation data 20 about the expected operating condition of a component during a transient event, e.g., the pressure of a fluid in the bypass conduit 10, the inlet temperature of steam in ST 8, and/or the exhaust pressure in GT 6. This correlation data 20 can be based upon the historical data 22 (empirical data) about one or more components in the CC power plant 4.

With continuing reference to the computing device 14, as described herein, the computing device 14 is configured to determine whether a change in an operating condition of a component in the CC power plant 4 is unintentional. An "intentional" change in an operating condition, as defined herein, is a change in the operating condition that falls within the predicted range of the correlation data 20 for the component. That is, when a transient event is initiated, the correlation data 20 will predict the operating condition (e.g., load, pressure, temperature, rejection amount, etc.) for the component(s) (e.g., GT 6, ST 8 and/or bypass conduit 10). The computing device 14 is configured to obtain data about the actual (real-time) operating condition of the component(s) (real-time data 24 from sensors (sensor system 26), and compare that real-time data 24 with the correlation data 20. If the real-time data 24 deviates from the correlation data 20 (e.g., by more than a threshold such as +/−3%), the computing device 14 determines that the change in the operating condition of the component is unintentional.

The computing device 14 can also be configured to provide instructions to the control system (CS) 12 of the CC power plant 4 to modify the operating condition in the CC power plant 4 in response to determining that the change in operating condition of the component (e.g., GT 6, ST 8 and/or bypass conduit 10) is unintentional.

In various embodiments, the computing device 14 is further configured to build the reference look-up table 18 by compiling historical data 22 about the CC power plant 4. The historical data 22 can be gathered over a period, such as a number of days, weeks, months or years, and may be updated periodically in order to improve the real-time accuracy of the historical data 22. The historical data 22 includes, for at least one of the at least one ST 8 or at least one of the at least one of the GT 6: a temperature rise, an exhaust temperature, a steam flow, an inlet pressure, an inlet air temperature, a drum level or a feed-water flow. In some embodiments, the historical data includes a steam flow and a bypass pressure for the bypass conduit 10. The reference look-up table 18 can be built as a preliminary process to determining whether the a change in an operating condition of a component of the CC power plant 4 is unintentional.

In various embodiments, the computing device 14 is further configured to calculate at least one of a degree of degradation of the CC power plant 4 based upon the operating condition, a level of manual intervention required to modify the operating condition, and a prediction of performance of the CC power plant 4, based upon the instructions to modify the operating condition.

One or more of the processes described herein can be performed, e.g., by at least one computing device, such as computing device 14, as described herein. In other cases, one or more of these processes can be performed according to a computer-implemented method. In still other embodiments, one or more of these processes can be performed by executing computer program code (e.g., CC plant load monitoring system 16) on at least one computing device (e.g., computing device 14), causing the at least one computing device to perform a process, e.g., monitoring a CC plant load.

In further detail, computing device 14 is shown including a processing component 122 (e.g., one or more processors), a storage component 124 (e.g., a storage hierarchy), an input/output (I/O) component 126 (e.g., one or more I/O interfaces and/or devices), and a communications pathway 128. In one embodiment, processing component 122 executes program code, such as CC plant load monitoring system 16, which is at least partially embodied in storage component 124. While executing program code, processing component 122 can process data, which can result in reading and/or writing the data to/from storage component 124 and/or I/O component 126 for further processing. Pathway 128 provides a communications link between each of the components in computing device 14. I/O component 126 can comprise one or more human I/O devices or storage devices, which enable user 136 and/or CS 138 to interact with computing device 14 and/or one or more communications devices to enable user 136 and/or CS 138 to communicate with computing device 14 using any type of communications link. To this extent, CC plant load monitoring system 16 can manage a set of interfaces (e.g., graphical user interface(s), application program interface, and/or the like) that enable human and/or system interaction with CC plant load monitoring system 16.

In any event, computing device 14 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, CC plant load monitoring system 16 can be embodied as any combination of system software and/or application software. In any event, the technical effect of computing device 14 is to monitor the load on a combined-cycle plant.

Further, CC plant load monitoring system 16 can be implemented using a set of modules 132. In this case, a module 132 can enable computing device 14 to perform a set of tasks used by CC plant load monitoring system 16, and can be separately developed and/or implemented apart from other portions of CC plant load monitoring system 16. CC plant load monitoring system 16 may include modules 132 which comprise a specific use machine/hardware and/or software. Regardless, it is understood that two or more modules, and/or systems may share some/all of their respective hardware and/or software. Further, it is understood that some of the functionality discussed herein may not be implemented or additional functionality may be included as part of computing device 14.

When computing device 14 comprises multiple computing devices, each computing device may have only a portion of CC plant load monitoring system 16 embodied thereon (e.g., one or more modules 132). However, it is understood that computing device 14 and CC plant load monitoring system 16 are only representative of various possible equivalent computer systems that may perform a process described herein. To this extent, in other embodiments, the functionality provided by computing device 14 and CC plant load monitoring system 16 can be at least partially implemented by one or more computing devices that include any combination of general and/or specific purpose hardware with or without program code. In each embodiment, the hardware and program code, if included, can be created using standard engineering and programming techniques, respectively.

Regardless, when computing device 14 includes multiple computing devices, the computing devices can communicate over any type of communications link. Further, while performing a process described herein, computing device 14 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, CC plant load monitoring system 16 enables computing device 14 to monitor a combined-cycle power plant. CC plant load monitoring system 16 may include logic for performing one or more actions described herein. In one embodiment, CC plant load monitoring system 16 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, CC plant load monitoring system 16 and logic included therein will be described herein as a specific use machine. As will be understood from the description, while logic is illustrated as including each of the above-stated functions, not all of the functions are necessary according to the teachings of the invention as recited in the appended claims.

In various embodiments, control system 12 and/or sensor system 16 may be configured to monitor operating parameters e.g., gas turbine operating parameters, steam turbine operating parameters, bypass conduit operating parameters, e.g., (e.g., operating conditions of GT 6, ST 8, bypass conduit 10 or other components in a CC power plant 4). In one embodiment, CC plant load monitoring system 16 can access real-time data 24 including, e.g., load information, inlet guide vane (IGV) position/angle information, pressure information, leakage information, etc., from control system 12 whenever the transient event occurs.

It is understood that in the flow diagram shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

In any case, the technical effect of the various embodiments of the invention, including, e.g., the CC plant load monitoring system 16, is to monitor a combined-cycle power plant 4, including one or more of its components, during a transient event.

Figure 2:
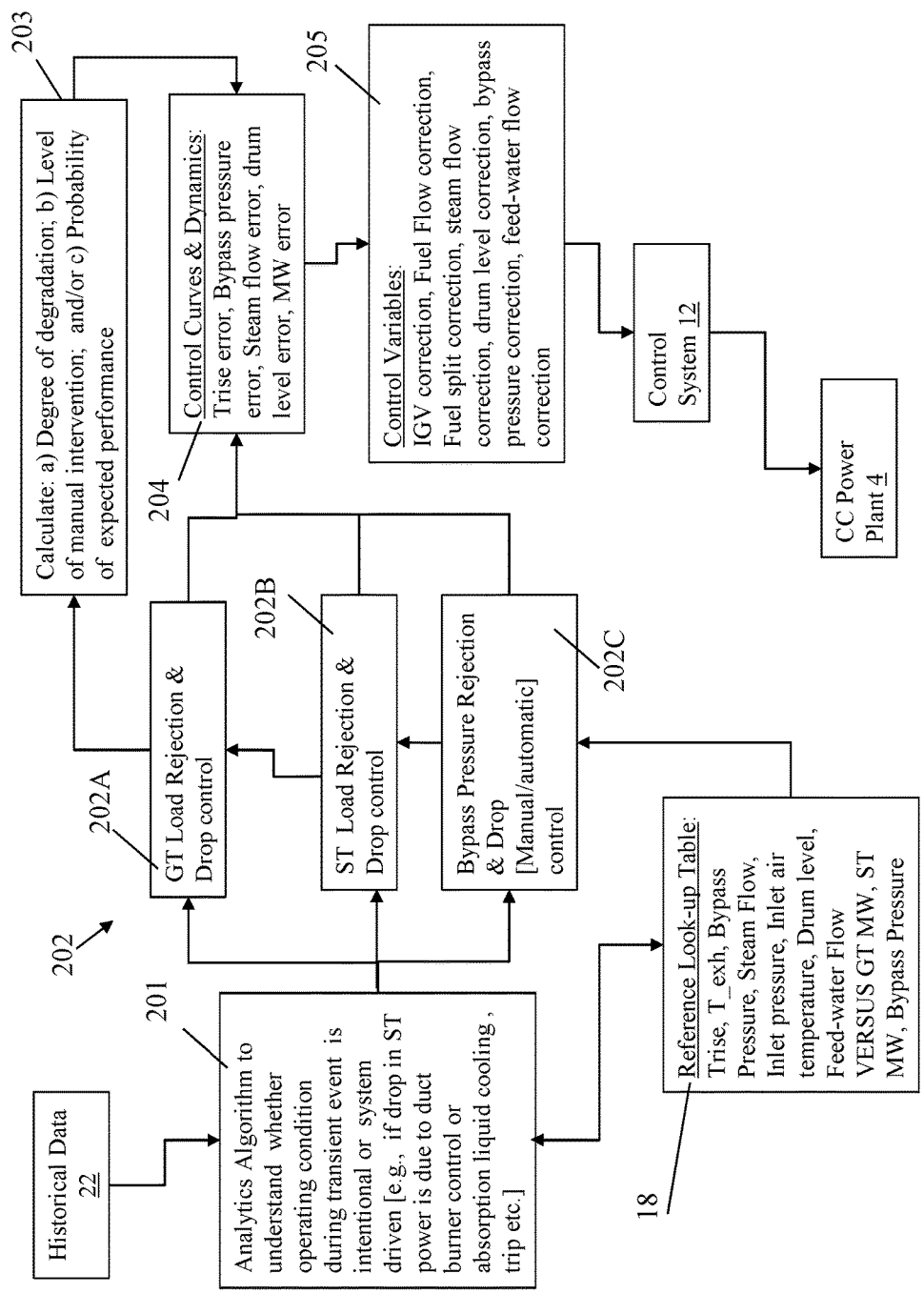
FIG. 2 shows a data-flow diagram illustrating a method performed according to various embodiments of the invention.

FIG. 2 shows an illustrative data-process flow diagram depicting particular processes and system architecture according to various embodiments of the invention. With continuing reference to FIG. 1, FIG. 2 shows, in process 201, an analytics algorithm (embedded within CC plant load monitoring system 16) is used to analyze historical data 22 to determine whether an operating condition during a transient event is intentional or system driven (unintentional). This can include utilizing the reference look-up table 18 to determine whether the operating condition deviates from the expected operating condition under the transient circumstances. Following process 201, process 202 can include one or more sub-processes, illustrated as 202A: GT load rejection and drop control; 202B: ST load rejection and drop control; and 202C: Bypass pressure rejection and drop. As described herein, these processes may be implemented in the case that the operating condition during the transient event is unintentional, and a modification to one or more operating parameters in the GT(s) 6, ST(s) 8 and/or bypass conduit(s) 10 is made. Following process 202, process 203 can include calculating at least one of a degree of degradation, a level of manual intervention and/or a probability of expected performance for the component. Based on real-time conditions and the state of the component(s) (such as gas turbine rotor, casing, compressor blades, pipes, valves etc.), the CC plant load monitoring system 16 (including a machine-learning-based algorithm) learns the trend and pattern within the real-time conditions to predict the probability and extent of degradation, potential manual intervention and expected performance of the CC power plant 4 in meeting the demand Process 204 can include generating control curves and dynamics for instructing the control system 12 to modify one or more operating conditions of the CC power plant 4. As shown, the control curves and dynamics can include at least one of a temperature rise, a bypass pressure error, a stem flow error, a drum level error or a mega-watt (MW) error for the component. Process 205 includes identifying control variables that can be manipulated by the control system 12 in order to execute the control curves generated in process 205 on the CC power plant 4. For example, control variables can include a loading rate of a boiler drum being modified based on herein-mentioned process, and a method in order to control thermal stresses and trip probabilities due to high level or low level. Additional control variables can include, among others, inlet guide vane (IGV) correction, fuel flow correction, fuel split correction, steam flow correction, drum level correction, bypass pressure correction and/or feed-water flow correction. These control variables can be provided to the control system 12, which can generate operating instructions in order to modify an operating condition of the CC power plant 4.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system comprising:
at least one computing device configured to monitor a combined-cycle (CC) power plant during a transient event, wherein the CC power plant includes at least one steam turbine (ST), at least one gas turbine (GT), and at least one bypass conduit bypassing one of the at least one ST or the at least one GT, the at least one computing device configured to monitor the CC power plant during the transient event by performing actions including:

determining whether a change in an operating condition of a component of the CC power plant is unintentional, the determining including comparing control system instructions for the component of the CC power plant with a reference look-up table, the reference look-up table including correlation data for the control system instructions for the component and historical data about the operating condition of the component, wherein the correlation data indicates a predicted operating condition for the component;

wherein the at least one computing device is configured to build the reference look-up table by compiling the historical data, the historical data including, for at least one of the at least one ST or at least one of the at least one of the GT: a temperature rise, an exhaust temperature, a steam flow, an inlet pressure, an inlet air temperature, a drum level or a feed-water flow;

wherein the historical data is updated periodically in order to improve a real-time accuracy of the historical data;

the at least one computing device is configured to determine the change in the operating condition of the component in response to actual data about the operating condition deviating from the predicted operating condition; and modifying the operating condition in the CC power plant, using a control system of the CC power plant, in response to determining that the change in operating condition of the component is unintentional.

2. The system of claim 1, wherein the historical data further includes a bypass conduit steam flow and a bypass pressure for the at least one bypass conduit.

3. The system of claim 1, wherein the operating condition includes a power sharing proportion between the at least one ST and the at least one GT, a load rejection by the at least one ST or the at least one GT, a bypass flow rate through the at least one bypass conduit, or a power drop by the at least one ST or the at least one GT.

4. The system of claim 3, wherein the operating condition is measured by at least one of ST megawatt output, GT megawatt output or fluid pressure in the at least one bypass conduit.

5. The system of claim 1, wherein the at least one computing device is further configured to calculate at least one of a degree of degradation of the CC power plant based upon the operating condition, a level of manual intervention required to modify the operating condition, and a prediction of performance of the CC power plant, based upon the modifying of the operating condition.

6. A computer program product comprising program code stored on a non-transitory computer readable medium, wherein when the program code is executed by at least one computing device, the program code causes the at least one computing device to monitor a combined-cycle (CC) power plant during a transient event, wherein the CC power plant includes at least one steam turbine (ST), at least one gas turbine (GT), and at least one bypass conduit bypassing one of the at least one ST or the at least one GT, the computing device monitoring the CC power plant during the transient event by performing actions including:

determining whether a change in an operating condition of a component of the CC power plant is unintentional, the determining including comparing control system instructions for the component of the CC power plant with a reference look-up table, the reference look-up table including correlation data for the control system instructions for the component and historical data about the operating condition of the component, wherein the correlation data indicates a predicted operating condition for the component;

wherein the program code causes the at least one computing device to build the reference look-up table by compiling the historical data, the historical data including, for at least one of the at least one ST or at least one of the at least one of the GT: a temperature rise, an exhaust temperature, a steam flow, an inlet pressure, an inlet air temperature, a drum level or a feed-water flow;

wherein the historical data is updated periodically in order to improve a real-time accuracy of the historical data;

wherein the program code causes the at least one computing device to determine the change in the operating condition of the component in response to actual data about the operating condition deviating from the predicted operating condition; and modifying the operating condition in the CC power plant, using a control system of the CC power plant, in response to determining that the change in operating condition of the component is unintentional.

7. The computer program product of claim 6, wherein the historical data further includes a bypass conduit steam flow and a bypass pressure for the at least one bypass conduit.

8. The computer program product of claim 6, wherein the operating condition includes a power sharing proportion between the at least one ST and the at least one GT, a load rejection by the at least one ST or the at least one GT, a bypass flow rate through the at least one bypass conduit, or a power drop by the at least one ST or the at least one GT.

9. The computer program product of claim 8, wherein the operating condition is measured by at least one of ST megawatt output, GT megawatt output or fluid pressure in the at least one bypass conduit.

10. The computer program product of claim 6, wherein the program code causes the at least one computing device to further calculate at least one of a degree of degradation of the CC power plant based upon the operating condition, a level of manual intervention required to modify the operating condition, and a prediction of performance of the CC power plant, based upon the modifying of the operating condition.

11. The system of claim 1, wherein modifying the operating condition of the CC power plant includes: generating control curves and dynamics about the CC power plant based upon the historical data; identifying control variables that can be manipulated by the control system to execute the control curves; and performing the modifying of the operating condition according to the control system instructions according to the identified control variables.

12. The system of claim 6, wherein modifying the operating condition of the CC power plant includes: generating control curves and dynamics about the CC power plant based upon the historical data; identifying control variables that can be manipulated by the control system to execute the control curves; and performing the modifying of the operating condition according to the control system instructions according to the identified control variables.

* * * * *